(12) United States Patent
Matsuda et al.

(10) Patent No.: US 9,236,732 B2
(45) Date of Patent: Jan. 12, 2016

(54) VOLTAGE REGULATOR

(71) Applicant: Seiko Instruments Inc., Chiba-shi, Chiba (JP)

(72) Inventors: Takashi Matsuda, Chiba (JP); Fumimasa Azuma, Phnom Penh (KH)

(73) Assignee: SEIKO INSTRUMENTS INC., Chiba (JP)

( * ) Notice: Subject to any disclaimer, the term of this patent is extended or adjusted under 35 U.S.C. 154(b) by 144 days.

(21) Appl. No.: 14/033,137

(22) Filed: Sep. 20, 2013

(65) Prior Publication Data

US 2014/0091776 A1 Apr. 3, 2014

(30) Foreign Application Priority Data

Sep. 28, 2012 (JP) .................... 2012-217987

(51) Int. Cl.
*G05F 1/00* (2006.01)
*H02H 9/04* (2006.01)
*G05F 1/56* (2006.01)

(52) U.S. Cl.
CPC ... *H02H 9/04* (2013.01); *G05F 1/56* (2013.01)

(58) Field of Classification Search
CPC ........... G05F 1/575; G05F 1/613; G05F 3/20; G05F 1/56; G05F 3/30; G05F 1/565
USPC ......... 323/222, 224, 225, 271–281, 312–316; 330/255–257
See application file for complete search history.

(56) References Cited

U.S. PATENT DOCUMENTS

| | | | | |
|---|---|---|---|---|
| 6,469,480 B2 * | 10/2002 | Kanakubo | ............... | G05F 1/565 323/269 |
| 6,501,253 B2 * | 12/2002 | Marty | ..................... | G05F 1/565 323/274 |
| 7,106,032 B2 * | 9/2006 | Chen | ....................... | G05F 1/575 323/269 |
| 7,443,149 B2 * | 10/2008 | Nishimura et al. | ........... | 323/280 |
| 7,586,371 B2 * | 9/2009 | Tachibana | ............... | H03F 3/347 330/252 |
| 7,612,554 B2 * | 11/2009 | Sprecher | ................ | G01D 5/485 324/207.13 |
| 8,283,906 B2 * | 10/2012 | Shito | ............................. | 323/280 |

FOREIGN PATENT DOCUMENTS

JP    2005-301439 A    10/2005

* cited by examiner

*Primary Examiner* — Rajnikant Patel

(74) *Attorney, Agent, or Firm* — Brinks Gilson & Lione

(57) ABSTRACT

Provided is a voltage regulator capable of suppressing an overshoot with low current consumption. A comparator of an overshoot detection circuit is activated only when a power supply fluctuation occurs, and the comparator outputs a signal for reducing an overshoot occurring in an output voltage. In a steady state, the comparator of the overshoot detection circuit is turned off to prevent the current from being consumed.

3 Claims, 4 Drawing Sheets

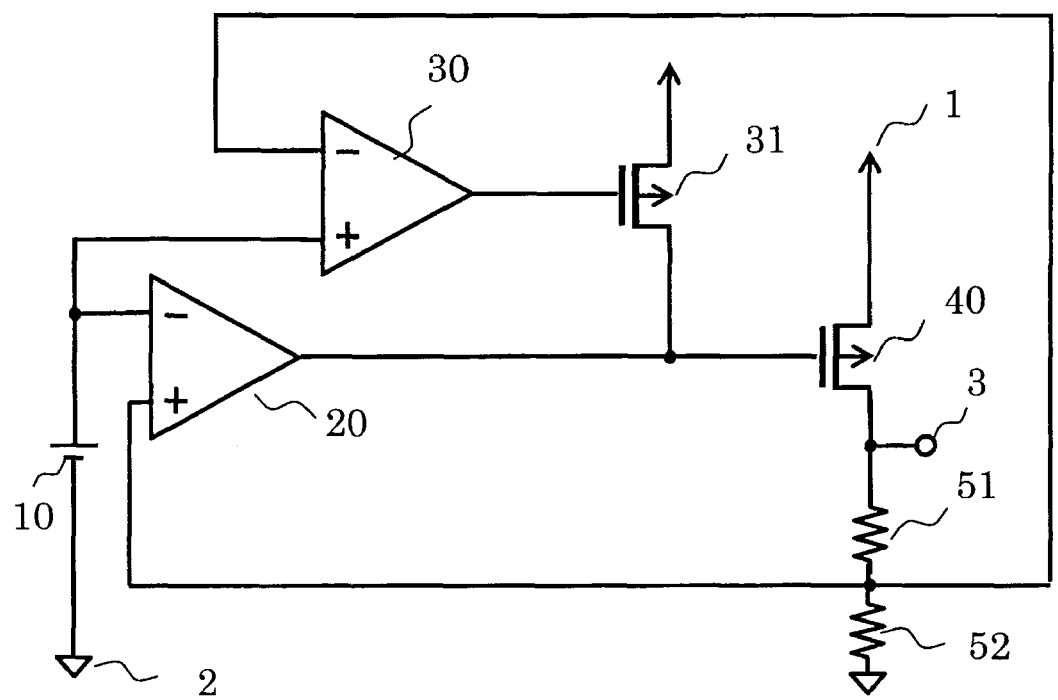

VOLTAGE REGULATOR

RELATED APPLICATIONS

This application claims priority under 35 U.S.C. §119 to Japanese Patent Application No. 2012-217987 filed on Sep. 28, 2012, the entire content of which is hereby incorporated by reference.

BACKGROUND OF THE INVENTION

1. Field of the Invention

The present invention relates to an overshoot detection circuit for a voltage regulator.

2. Description of the Related Art

A conventional voltage regulator is now described. FIG. 4 is a circuit diagram illustrating the conventional voltage regulator.

The conventional voltage regulator includes a power supply terminal 1, a ground terminal 2, an output terminal 3, a reference voltage circuit 10, a differential amplifier circuit 20, an overshoot detection circuit 30, PMOS transistors 31 and 40, and resistors 51 and 52.

The overshoot detection circuit 30 compares a feedback voltage divided by the resistors 51 and 52 with a reference voltage of the reference voltage circuit 10. Then, when the feedback voltage is lower than the reference voltage, the overshoot detection circuit 30 outputs HIGH to turn off the PMOS transistor 31. When an overshoot occurs in an output voltage of the output terminal 3 and the feedback voltage becomes higher than the reference voltage, the overshoot detection circuit 30 outputs LOW to turn on the PMOS transistor 31. As a result, the PMOS transistor 40 is turned off, and hence the overshoot can be prevented from being larger (see, for example, Japanese Patent Application Laid-open No. 2005-301439).

However, the conventional technology has the following problem.

In order to increase the response speed of the overshoot detection circuit 30, it is necessary to supply a sufficient current to the overshoot detection circuit 30 all the time. Thus, the current consumption is increased. If the current consumption of the overshoot detection circuit 30 is suppressed, the response speed of the overshoot detection circuit 30 is reduced, and hence it becomes difficult to suppress the overshoot quickly.

The present invention has been made in view of the above-mentioned problem, and provides a voltage regulator that includes an overshoot detection circuit having high response speed with low current consumption.

SUMMARY OF THE INVENTION

A voltage regulator according to one embodiment of the present invention includes: a differential amplifier circuit for amplifying a difference between a reference voltage and a divided voltage obtained by dividing an output voltage of an output transistor, and outputting the amplified difference to control a gate of the output transistor; and an overshoot detection circuit for detecting an overshoot in the output voltage of the output transistor, the overshoot detection circuit including: a capacitor for detecting a power supply fluctuation; a comparator for detecting an overshoot that occurs at the output transistor based on the reference voltage and the divided voltage, and outputting a signal for turning off the output transistor; a first transistor connected to the comparator, which is configured to be turned on to control a first current source to supply an operating current to the comparator when a signal indicating the detection of the power supply fluctuation is received from the capacitor, and to be turned off to control the first current source to prevent the operating current from being supplied to the comparator when the signal is not received; and a pull-down circuit connected to a gate of the first transistor.

According to the voltage regulator including the overshoot detection circuit of the present invention, the overshoot detection circuit consumes no current in the steady state but operates only for a predetermined period of time after the power supply fluctuation, and hence there is an effect that the overshoot can be reduced with low current consumption.

BRIEF DESCRIPTION OF THE DRAWINGS

In the accompanying drawings:

FIG. 4 is a circuit diagram illustrating a conventional voltage regulator.

DETAILED DESCRIPTION OF THE PREFERRED EMBODIMENTS

A voltage regulator of the present invention is described below with reference to the accompanying drawings.

First Embodiment

Figure 1:
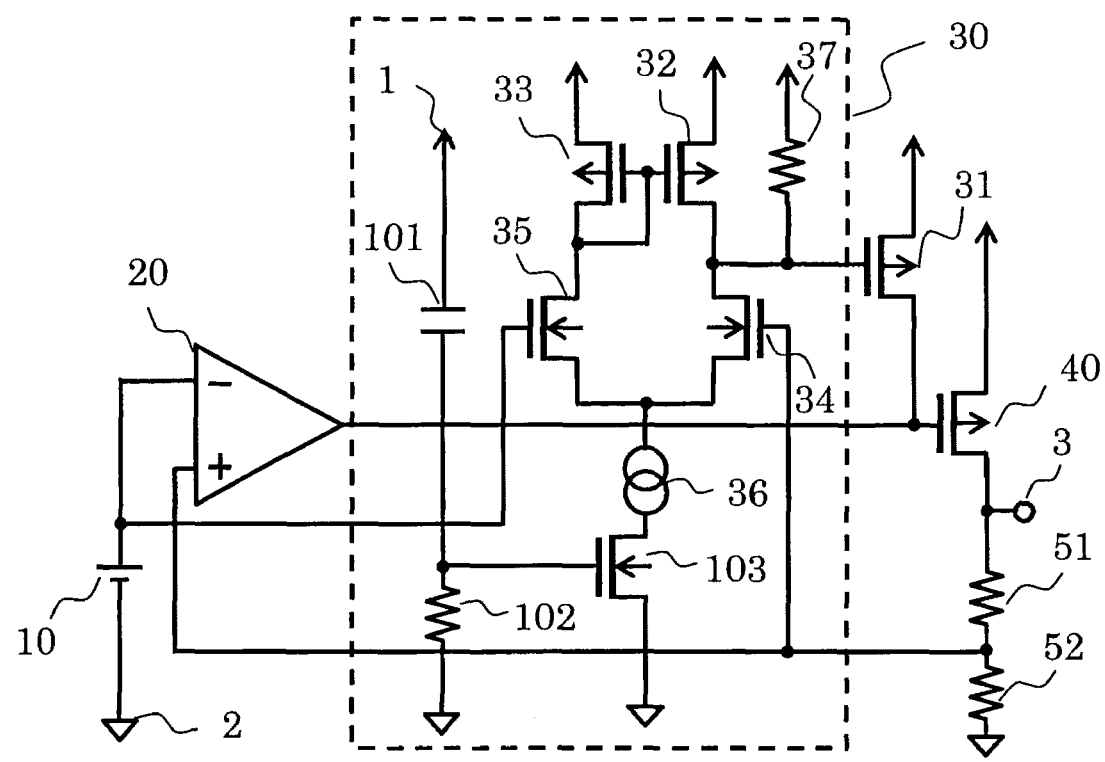
FIG. 1 is a circuit diagram illustrating a voltage regulator according to a first embodiment of the present invention.

FIG. 1 is a circuit diagram of a voltage regulator according to a first embodiment of the present invention.

The voltage regulator according to the first embodiment includes an overshoot detection circuit 30, a differential amplifier circuit 20, a reference voltage circuit 10, resistors 51 and 52, PMOS transistors 31 and 40, a power supply terminal 1, a ground terminal 2, and an output terminal 3. The overshoot detection circuit 30 includes PMOS transistors 32 and 33, NMOS transistors 34, 35, and 103, resistors 37 and 102, a constant current source 36, and a capacitor 101. The PMOS transistors 32 and 33, the NMOS transistors 34 and 35, and the constant current source 36 together form a comparator. In this case, the constant current source 36 is capable of supplying such a current as to sufficiently increase the response speed of the comparator so that an overshoot at the output terminal may be reduced quickly.

Next, a description is given of connections in the voltage regulator according to the first embodiment.

The differential amplifier circuit 20 has an inverting input terminal connected to one terminal of the reference voltage circuit 10, a non-inverting input terminal connected to a connection point between one terminal of the resistor 51 and one terminal of the resistor 52, and an output terminal connected to a drain of the PMOS transistor 31 and a gate of the PMOS transistor 40. The PMOS transistor 40 has a source connected to the power supply terminal 1, and a drain connected to the output terminal 3 and the other terminal of the resistor 51. The other terminal of the reference voltage circuit 10 is connected to the ground terminal 2. The other terminal of the resistor 52 is connected to the ground terminal 2. The PMOS transistor 32 has a source connected to the power supply terminal 1, and a gate connected to a gate and a drain of the PMOS transistor 33 and a drain of the NMOS transistor 35. The PMOS transistor 32 has a drain connected to a drain of the NMOS transistor 34, a gate of the PMOS transistor 31, and one terminal of the resistor 37. The PMOS transistor 31 has a source connected to the power supply terminal 1. The other terminal of the resistor 37 is connected to the power supply terminal 1. The PMOS transistor 33 has a source connected to the power supply terminal 1. The NMOS transistor 34 has a gate connected to the connection point between the one terminal of the resistor 51 and the one terminal of the resistor 52, and a source connected to a source of the NMOS transistor 35 and the constant current source 36. The NMOS transistor 35 has a gate connected to the inverting input terminal of the differential amplifier circuit 20. The NMOS transistor 103 has a source connected to the ground terminal 2 and a drain connected to the constant current source 36. The capacitor 101 has one terminal connected to the power supply terminal 1 and the other terminal connected to one terminal of the resistor 102 and a gate of the NMOS transistor 103. The other terminal of the resistor 102 is connected to the ground terminal 2.

Next, a description is given of the operation of the voltage regulator according to the first embodiment.

The resistors 51 and 52 divide an output voltage Vout, which is a voltage of the output terminal 3, and output a divided voltage Vfb. The differential amplifier circuit 20 compares the divided voltage Vfb with a reference voltage Vref of the reference voltage circuit 10, and controls a gate voltage of the PMOS transistor 40, which operates as an output transistor, so that the output voltage Vout may be constant. When the output voltage Vout is higher than a predetermined voltage, the divided voltage Vfb is higher than the reference voltage Vref. Then, an output signal of the differential amplifier circuit 20 (the gate voltage of the PMOS transistor 40) becomes higher, and the PMOS transistor 40 is gradually turned off to decrease the output voltage Vout. In this way, the output voltage Vout is controlled to be constant. On the other hand, when the output voltage Vout is lower than the predetermined voltage, the operation opposite to the above is performed to increase the output voltage Vout. In this way, the output voltage Vout is controlled to be constant. In such a steady state, the NMOS transistor 103 is turned off, and the overshoot detection circuit 30 consumes no current at all.

When a voltage of the power supply terminal 1 changes and the power supply fluctuates, the gate of the NMOS transistor 103 is pulled up via the capacitor 101 to turn on the NMOS transistor 103. Then, the comparator formed of the PMOS transistors 32 and 33, the NMOS transistors 34 and 35, and the constant current source 36 is activated. When an overshoot occurs at the output terminal 3 due to the power supply fluctuation and the divided voltage Vfb becomes higher than the reference voltage Vref, the comparator detects this state and outputs a signal of Low to the output of the comparator. In this way, the PMOS transistor 31 is turned on to pull up the gate of the PMOS transistor 40 to the power supply voltage, to thereby turn off the PMOS transistor 40 and suppress the overshoot occurring at the output terminal 3.

When a predetermined period of time has elapsed since the occurrence of the power supply fluctuation, the gate voltage of the NMOS transistor 103 is decreased by the resistor 102, and the NMOS transistor 103 is turned off after the predetermined period of time. Because the NMOS transistor 103 is turned off, the comparator is turned off, and the output of the comparator is pulled up by the resistor 37 to turn off the PMOS transistor 31 as well. In this way, the flow of the current to the comparator can be stopped after the power supply fluctuation to prevent the current from being consumed.

Note that, the resistor 37 is not limited to a resistive element, and any configuration can be used as long as the output of the comparator can be pulled up. The resistor 102 is not limited to a resistive element, and any configuration can be used as long as the gate of the NMOS transistor 103 can be pulled down.

As described above, when the power supply fluctuation occurs, the comparator is activated sufficiently earlier than the timing at which an overshoot occurs at the output terminal, and hence the overshoot occurring at the output terminal can be reduced. Further, in the steady state, the comparator is turned off, and hence the current can be prevented from being consumed by the overshoot detection circuit.

Second Embodiment

Figure 2:
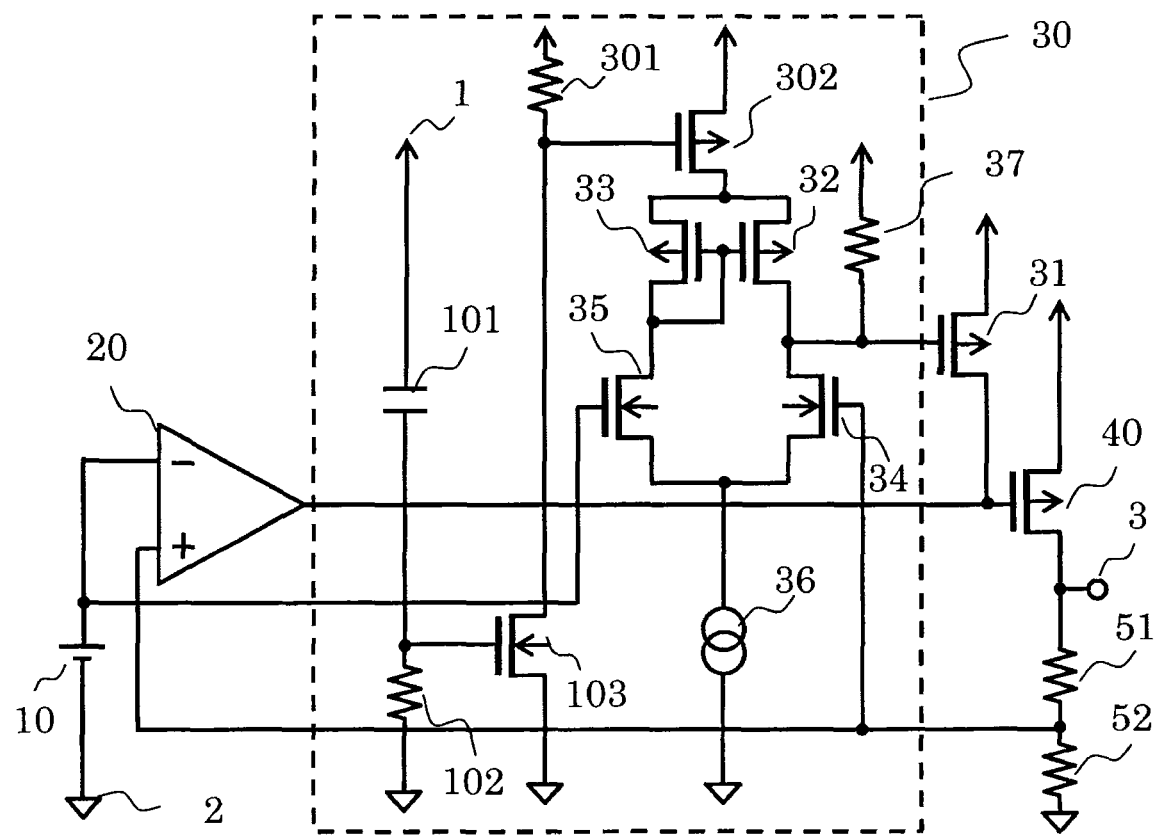
FIG. 2 is a circuit diagram illustrating a voltage regulator according to a second embodiment of the present invention.

FIG. 2 is a circuit diagram of a voltage regulator according to a second embodiment of the present invention. The second embodiment is different from the first embodiment in that the position of controlling the on/off of the comparator is changed. Specifically, a resistor 301 and a PMOS transistor 302 are added to the NMOS transistor 103, and the on/off of the comparator is controlled by the PMOS transistor 302.

Next, a description is given of connections in the voltage regulator according to the second embodiment. The NMOS transistor 103 has a drain connected to a gate of the PMOS transistor 302 and one terminal of the resistor 301. The other terminal of the resistor 301 is connected to the power supply terminal 1. The PMOS transistor 302 has a source connected to the power supply terminal 1, and a drain connected to the source of the PMOS transistor 33 and the source of the PMOS transistor 32. The other circuit configurations and connections are the same as those in the first embodiment.

Next, a description is given of the operation of the voltage regulator according to the second embodiment. The operation in the steady state is the same as that in the first embodiment. The NMOS transistor 103 is turned off, and the gate of the PMOS transistor 302 is pulled up. Accordingly, the PMOS transistor 302 is also turned off, and hence no operating current flows through the overshoot detection circuit 30 at all.

When a voltage of the power supply terminal 1 changes and the power supply fluctuates, the gate of the NMOS transistor 103 is pulled up via the capacitor 101 to turn on the NMOS transistor 103 and the PMOS transistor 302. Then, the comparator formed of the PMOS transistors 32 and 33, the NMOS transistors 34 and 35, and the constant current source 36 is activated. When an overshoot occurs at the output terminal 3 due to the power supply fluctuation and the divided voltage Vfb becomes higher than the reference voltage Vref, the comparator detects this state and outputs a signal of Low to the output of the comparator. In this way, the PMOS transistor 31 is turned on to pull up the gate of the PMOS transistor 40 to the power supply voltage, to thereby turn off the PMOS transistor 40 and suppress the overshoot occurring at the output terminal 3.

When a predetermined period of time has elapsed since the occurrence of the power supply fluctuation, the gate voltage of the NMOS transistor 103 is decreased by the resistor 102, and the NMOS transistor 103 is turned off after the predetermined period of time. Because the NMOS transistor is turned off, the gate of the PMOS transistor 302 is pulled up to turn off the PMOS transistor 302, to thereby turn off the comparator. The output of the comparator is pulled up by the resistor 37 to turn off the PMOS transistor 31 as well. In this way, the flow of the current to the comparator can be stopped after the power supply fluctuation to prevent the current from being consumed.

Note that, the resistors 37 and 301 are not limited to resistive elements, and any configuration can be used respectively as long as the output of the comparator and the gate of the PMOS transistor 302 can be pulled up. The resistor 102 is not limited to a resistive element, and any configuration can be used as long as the gate of the NMOS transistor 103 can be pulled down.

As described above, when the power supply fluctuation occurs, the comparator is activated sufficiently earlier than the timing at which an overshoot occurs at the output terminal, and hence the overshoot occurring at the output terminal can be reduced. Further, in the steady state, the comparator is turned off, and hence the current can be prevented from being consumed by the overshoot detection circuit.

Third Embodiment

Figure 3:
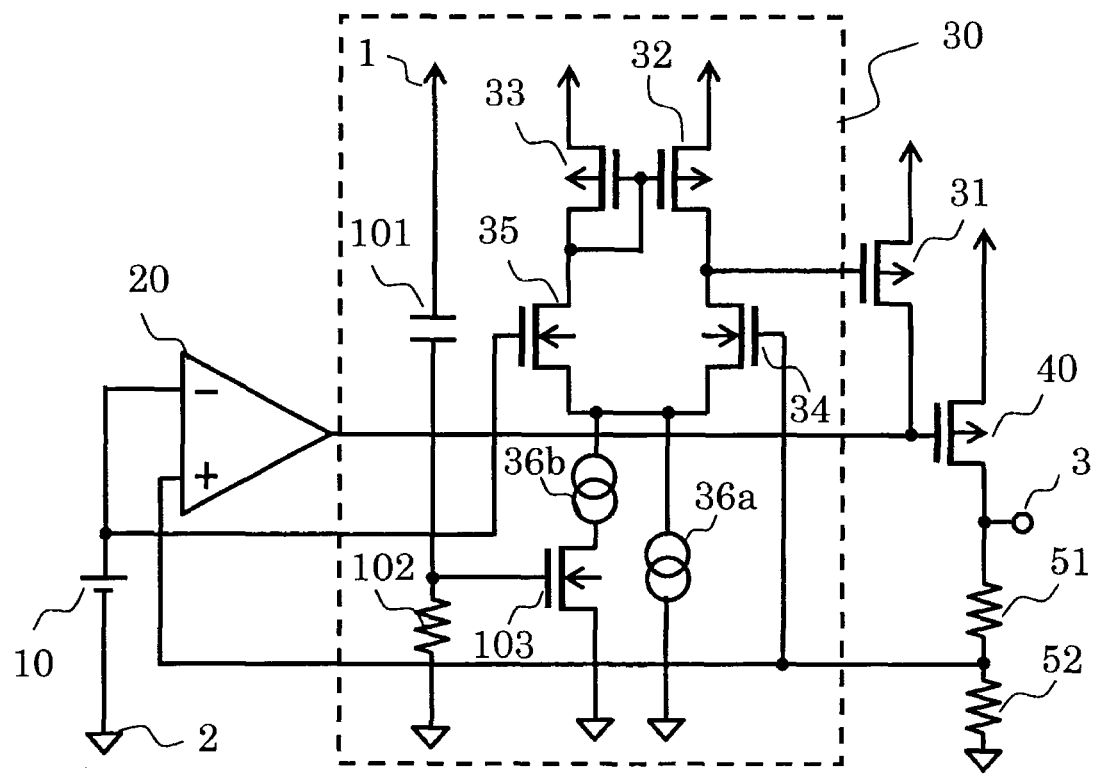
FIG. 3 is a circuit diagram illustrating a voltage regulator according to a third embodiment of the present invention.

FIG. 3 is a circuit diagram of a voltage regulator according to a third embodiment of the present invention. The third embodiment is different from the first embodiment in that the circuit configuration is changed to control the amount of the operating current instead of controlling the on/off of the comparator. Specifically, the constant current source 36 is divided into a constant current source 36a and a constant current source 36b, and the NMOS transistor 103 is connected to the constant current source 36b. In this case, the constant current source 36a is designed to supply such a small current as to operate the comparator, and the constant current source 36b is designed to supply a large current for reducing an overshoot at the output terminal quickly. Then, because the comparator operates all the time, the resistor 37 for pulling up the output terminal is deleted.

Next, a description is given of connections in the voltage regulator according to the third embodiment. One terminal of the constant current source 36a and one terminal of the constant current source 36b are connected to the source of the NMOS transistor 34 and the source of the NMOS transistor 35. The other terminal of the constant current source 36a is connected to the ground terminal 2. The other terminal of the constant current source 36b is connected to the drain of the NMOS transistor 103. The other circuit configurations and connections are the same as those in the first embodiment.

Next, a description is given of the operation of the voltage regulator according to the third embodiment. The operation in the steady state is the same as that in the first embodiment. The NMOS transistor 103 is turned off, and the comparator operates with the current supplied from the constant current source 36a. Accordingly, the current consumed by the overshoot detection circuit 30 can be suppressed to be small.

When the voltage of the power supply terminal 1 changes and the power supply fluctuates, the gate of the NMOS transistor 103 is pulled up via the capacitor 101 to turn on the NMOS transistor 103. The comparator can operate at high speed because the operating current is the currents of the constant current source 36a and the constant current source 36b. When an overshoot occurs at the output terminal 3 due to the power supply fluctuation and the divided voltage Vfb becomes higher than the reference voltage Vref, the comparator detects this state and outputs a signal of Low to the output of the comparator. In this way, the PMOS transistor 31 is turned on to pull up the gate of the PMOS transistor 40 to the power supply voltage, to thereby turn off the PMOS transistor 40 and suppress the overshoot occurring at the output terminal 3.

When a predetermined period of time has elapsed since the occurrence of the power supply fluctuation, the gate voltage of the NMOS transistor 103 is decreased by the resistor 102, and the NMOS transistor 103 is turned off after the predetermined period of time. In this way, the current consumed by the comparator after the power supply fluctuation is suppressed to be small.

Note that, the resistor 102 is not limited to a resistive element, and any configuration can be used as long as the gate of the NMOS transistor 103 can be pulled down.

As described above, when the power supply fluctuation occurs, the comparator can be brought into the high-speed operation state sufficiently earlier than the timing at which an overshoot occurs at the output terminal, and hence the overshoot occurring at the output terminal can be reduced. Further, in the steady state, the current consumed by the comparator can be suppressed to be small, and hence the current consumed by the overshoot detection circuit can be suppressed to be small.

What is claimed is:

1. A voltage regulator, comprising:
   a differential amplifier circuit for amplifying a difference between a reference voltage and a divided voltage obtained by dividing an output voltage of an output transistor, and outputting the amplified difference to control a gate of the output transistor; and
   an overshoot detection circuit for detecting an overshoot in the output voltage of the output transistor,
   the overshoot detection circuit comprising:
   a capacitor for detecting a power supply fluctuation;
   a comparator for detecting an overshoot that occurs at the output transistor based on the reference voltage and the divided voltage, and outputting a signal for turning off the output transistor;
   a first constant current source having a first end connected to the comparator and a second end connected to a first transistor;
   wherein the first transistor is configured to be turned on to allow current from the first constant current source supply current to the comparator when a signal indicating the detection of the power supply fluctuation is received from the capacitor, and the first transistor is configured to be turned off to prevent the current from the first constant current source from being supplied to the comparator when the signal is not received to thereby prevent the comparator from outputting the signal for turning off the output transistor; and
   a pull-down circuit connected to a gate of the first transistor.

2. A voltage regulator according to claim 1, further comprising:
   a second transistor including a gate connected to an output terminal of the comparator and a drain connected to the gate of the output transistor; and
   a second constant current source for supplying a current smaller than a current of the first constant current source to the comparator.

3. A voltage regulator according to claim 1, further comprising:
   a second transistor including a gate connected to an output terminal of the comparator and a drain connected to the gate of the output transistor; and
   a pull-up circuit connected to the output terminal of the comparator.

* * * * *